H. KENWARD.
REEL.
APPLICATION FILED NOV. 5, 1910.
1,019,802.
Patented Mar. 12, 1912.
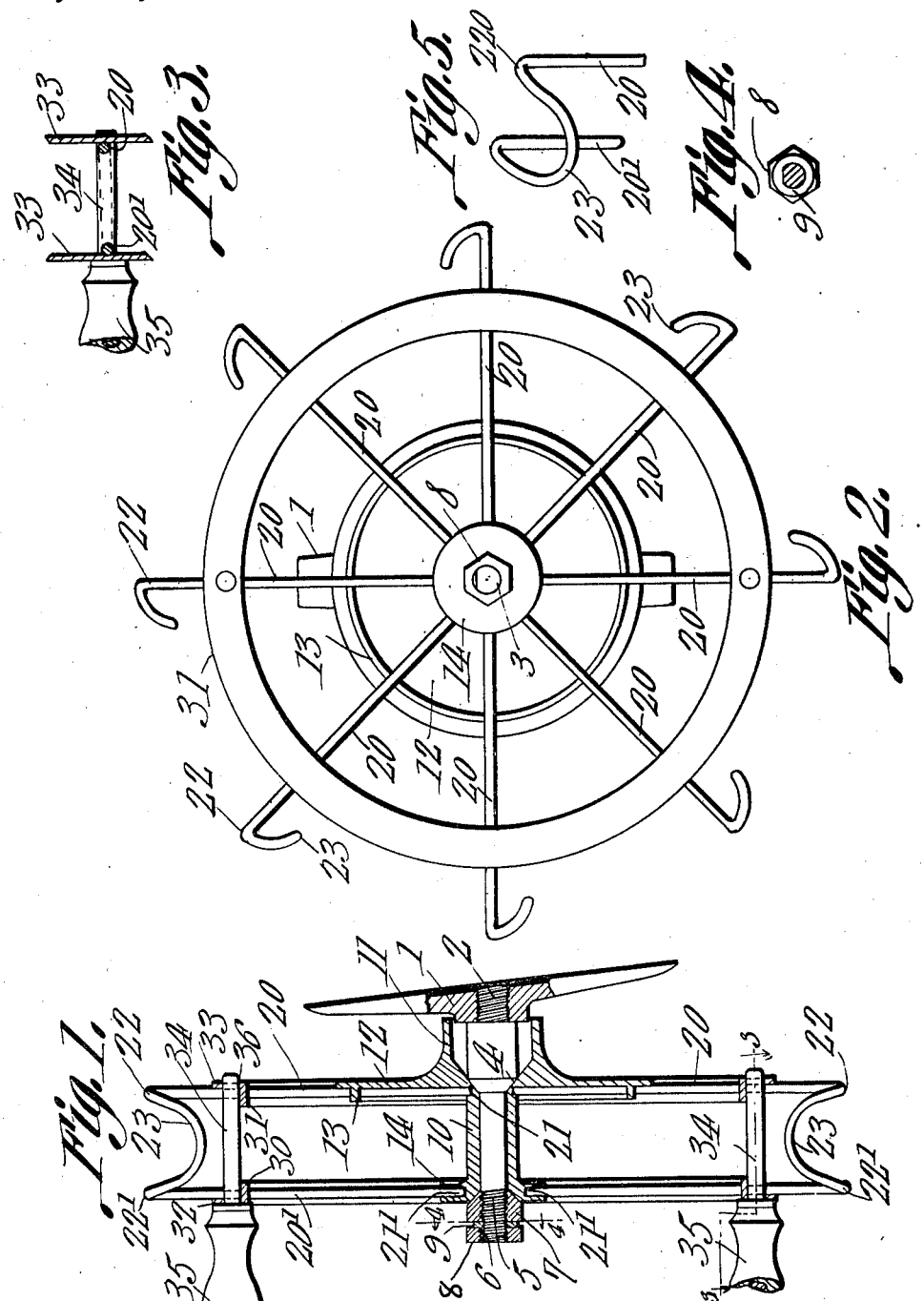

UNITED STATES PATENT OFFICE.

HENRY KENWARD, OF JONESBORO, ARKANSAS.

REEL.

1,019,802.  Specification of Letters Patent.  Patented Mar. 12, 1912.

Application filed November 5, 1910. Serial No. 590,877.

*To all whom it may concern:*

Be it known that I, HENRY KENWARD, a citizen of the United States, residing at Jonesboro, in the county of Craighead and State of Arkansas, have invented a new and useful Reel, of which the following is a specification.

This invention relates to fishing, and more especially to the reels for winding fish line; and the object of the same is to produce a light, strong, and simple reel upon which the line can be wound and allowed to dry.

To this end the invention consists in the details of construction set forth and claimed below and shown in the drawings wherein—

Figure 1 is a central vertical section of this reel complete. Fig. 2 is an outside elevation. Figs. 3 and 4 are sections on the lines 3—3 and 4—4 of Fig. 1. Fig. 5 is a perspective detail showing one of the arms in its preferred shape.

In the drawings the numeral 1 designates a base plate intended to be attached to a fish pole in any suitable manner. This plate has a socket into which takes a screw 2 at the inner end of a spindle 3 which carries a fixed cone 4 and is threaded at its outer end as at 5 and the threads flattened at one point as at 6. Onto the threads screws the outer cone 7 held by a nut 8, and between these elements is a washer 9 whose hole is flattened at one side to fit the flattened side 6 of the spindle. Around the spindle thus formed is disposed a metallic hub which comprises a tubular body 10 flared at its ends to fit the cones as usual and having its inner extremity elongated as at 11 so that the thumb or fingers of the operator may bear against it to retard the rotation of the reel when desired. At its inner end the hub has a wide flange 12 having near its outer periphery an angular extension 13 pierced with radial holes, and at its outer end the hub has a narrower flange 14 provided with radial sockets.

The arms of the reel are of wire and alike, and a description of one will suffice for all. Each has an inner leg 20 seated at its extremity in a socket 21 in the hub, extending thence radially outward through the hole in the flange extension 13, bent inward upon itself as at 22, continued in a U-shaped bend 23 which forms the periphery of the reel, then forming a second bend 22′, and continued thence radially inward in an outer leg 20′, with the inner extremity thereof seated in a socket 21′ in the outer flange 14. Preferably about eight of these arms are disposed around the hub, or more if the reel is to be large and the U-shaped bend 23 forming the periphery thereof is to be quite remote from the axis.

It will be obvious that when a damp or wet fish line is wound upon a reel of this kind, unless the latter is very full of line it may be permitted to dry thereon because the air has access to all sides of the line instead of only to its radially outer side as in the ordinary reel.

For giving rigidity to the arms I provide two bands of L-shaped cross section whose inner flanges 30 and 31 are pierced with holes for the legs 20 and 20′, and whose outer flanges 32 and 33 stand parallel with each other and against the outer faces of said legs. Through said outer flanges passes a spindle 34 upon which is journaled a handle 35, the inner end of the latter resting against one of said flanges as 32, and the inner end of the spindle passing through and being upset against the other flange 33 as at 36. The legs 20 and 20′ pass transversely through the spindle 34 as seen in Fig. 3 whereby it is locked against loss or rotation, but the handle 35 turns upon the spindle in the customary manner. I prefer and have shown two such handles on the reel.

The use of this device is obvious and needs no elaboration here.

Instead of cone bearings, ball bearings could be used without departing from the spirit of my invention.

In Fig. 5 is best illustrated the preferred form which I give to the inward or reëntrant bend at the outer end of each arm. That is to say, the legs 20 and 20′ are connected at their outer ends by a U-shaped bend 23 as above described and which forms the periphery of the reel, and to form this bend the legs are bent inward as also above described, but in my preferred form the inward bend 22 is laterally deflected so that the U-shaped bend 23 does not stand in line with the two legs. The result is that when it is desired to enlarge the periphery of the reel the bends 23 of the several arms can be bent outward to quite a degree and still they will retain their U-shape, and when it is desired to reduce the periphery of the reel the bends 23 of the several arms are bent inward.

I claim:—

In a fishing reel, the combination with a spindle and a hub journaled on the spindle having a wide inner flange with an extension and a narrower outer flange; of reel arms each consisting of a single piece of wire formed into two legs connected at their outer ends by a U-shaped bend with one leg passing radially through said extension, and the tips of both seated in sockets in the hub, two bands of L-shaped section pierced with holes through which the legs pass, and a handle, the spindle of which passes through the flanges of the L-shaped section and is itself pierced with transverse holes through which the legs of one of said arms pass.

In testimony that I claim the forgoing as my own, I have hereto affixed my signature in the presence of two witnesses.

HENRY KENWARD.

Witnesses:
J. E. PARR,
JOSEPH GATZ, Jr.